Aug. 15, 1944.   F. W. A. HENRICI   2,355,975
LIQUID TEMPERATURE CONTROL UNIT
Filed March 3, 1942     3 Sheets-Sheet 1

INVENTOR
FRITZ W. A. HENRICI
BY Bodell and Thompson
ATTORNEYS

Aug. 15, 1944.  F. W. A. HENRICI  2,355,975
LIQUID TEMPERATURE CONTROL UNIT
Filed March 3, 1942  3 Sheets-Sheet 2
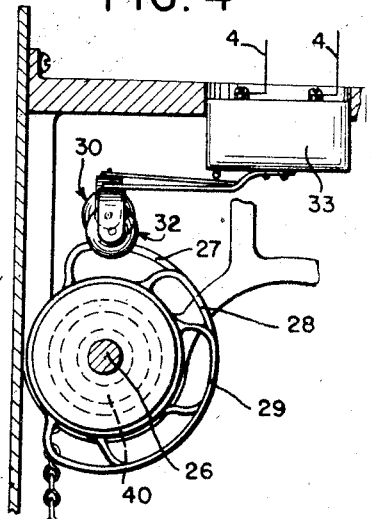
FIG. 4
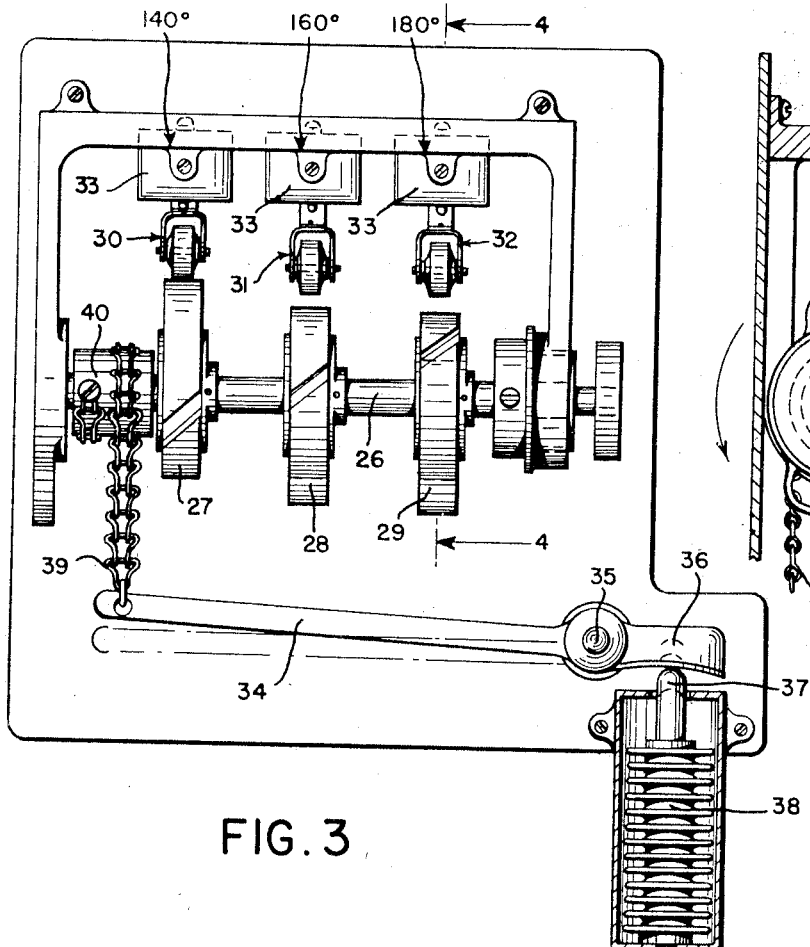
FIG. 3
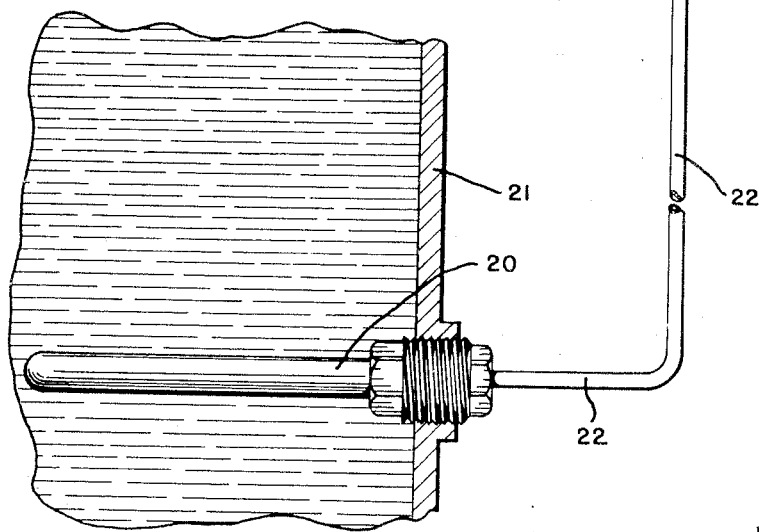
INVENTOR
FRITZ W. A. HENRICI
BY Bodell and Thompson
ATTORNEYS

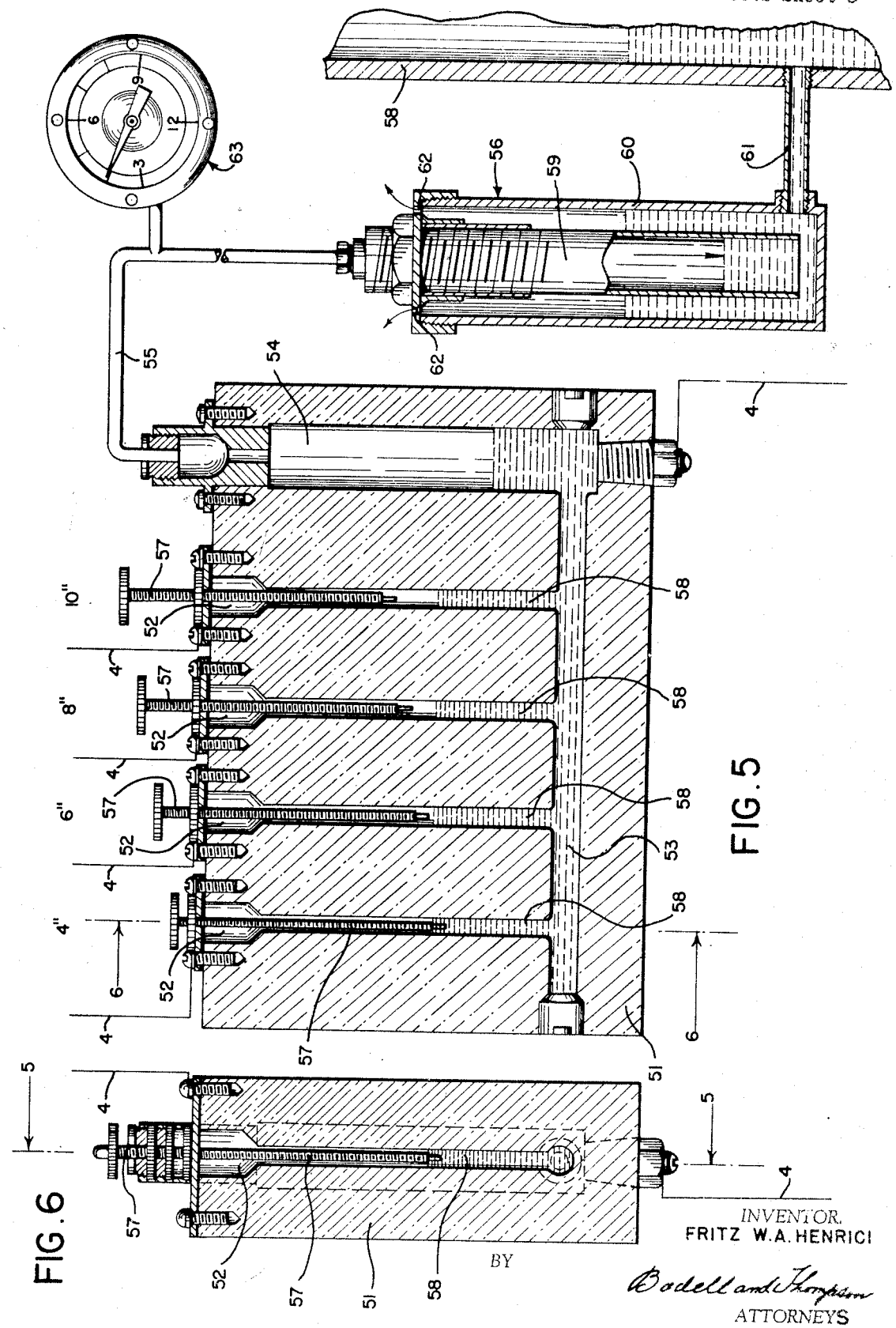

Patented Aug. 15, 1944

2,355,975

UNITED STATES PATENT OFFICE 2,355,975

LIQUID TEMPERATURE CONTROL UNIT

Fritz W. A. Henrici, Milton, Mass., assignor to The Prosperity Company, Inc., Syracuse, N. Y., a corporation of New York Application March 3, 1942, Serial No. 433,185

6 Claims. (Cl. 200—83)

This invention relates to controls for controling the condition (temperature or quantity) of the liquid in a receptacle, as for instance, for controlling the temperature or level of the water in the receptacle, tub or drum of a commercial laundry washing machine. In a commercial laundry washing machine, cleansing liquids at different temperatures and levels are used at different periods in the washing cycle. In a washing cycle, there are different sudsing operations and rinsing operations at different temperatures and levels. These operations in modern laundry washing machines are controlled by a work cycle timer which carry out a predetermined program or formula of the washing cycle.

This invention has for its object a particularly simple and compact unit for controlling the various conditions of the liquid thereof at different periods in the washing cycle and usually controlled by a cycle timer, although it may be hand operated, as by setting selectively operable switches in control circuits.

The invention consists in the novel features and in the combinaitons and constructions hereinafter set forth and claimed.

In describing this invention, reference is had to the accompanying drawings in which like characters designate corresponding parts in all the views.

Figure 3 is a view similar to Figure 1 of a slightly modified form of the invention.

Figure 4 is a fragmentary sectional view taken on the plane of line 4—4, Figure 3.

Figure 5 is a longitudinal sectional view of another form of this control unit, taken on line 5—5, Figure 6.

Figure 6 is a sectional view taken on the plane of line 6—6, Figure 5.

This control unit for controlling a predetermined condition in the liquid in a receptacle, as the receptacle or drum of a washing machine, includes a suitable frame, a series of successively operated, normally-open switches carried by the frame, each connected in a control circuit having a selectively closable switch therein, a pressure operated prime mover operable by the change in condition in the liquid in the receptacle to successively close the former switches, so that when one of the former switches connected in the circuit in which the selectivity operable switch is closed, means is operated to maintain the condition of the liquid at the time the particular former switch is closed. The condition of the liquid being controlled may be the temperature of the liquid or the quantity of the liquid, which is being fed into the receptacle. The liquid may be heated by heating means, usually steam, the flow of which is controlled by an electro-operated valve in a circuit controlled by the selectively closable switch. The quantity of water flowing into the receptacle may be controlled by a valve similarly operated, all as is well known by those familiar with the art.

In Figures 1 to 4, the control is shown operated by the temperature of the liquid in the receptacle, and in Figures 5 and 6 is shown a control operated by the quantity or level of the liquid in the receptacle. Both of these controls are a single compact unit readily applied to a machine, as a washing machine, for operation by a cycle timer, and both units are applied to each machine. Both include a series of selectively closable switches operated by a pressure operated prime mover, the pressure in which is generated or modified by a change in condition in the receptacle. In the temperature control, the pressure is modified by a change in temperature. In a level control by changes in the level.

Figure 1:
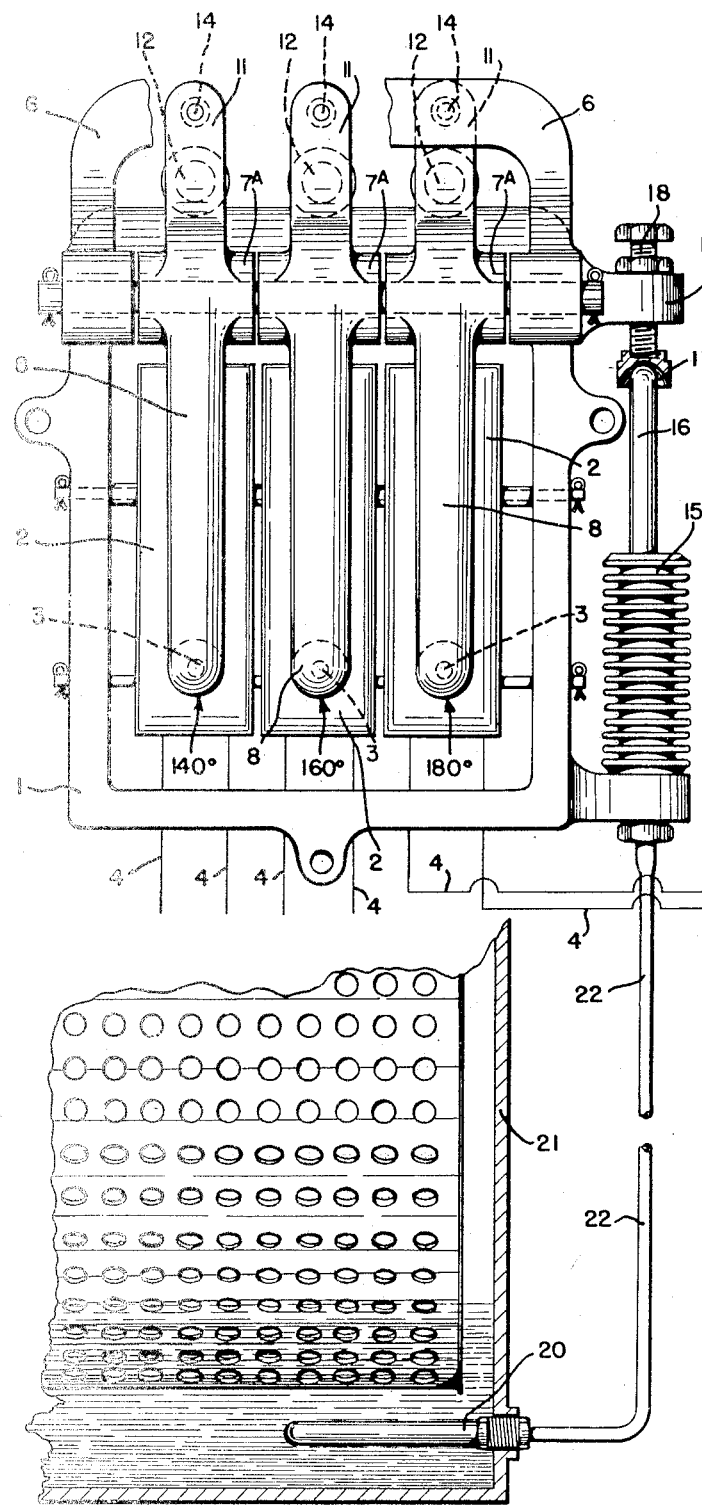
Figure 1 is an elevation of a temperature control unit, a portion of the receptacle of the washing machine being also shown.
Figure 2:
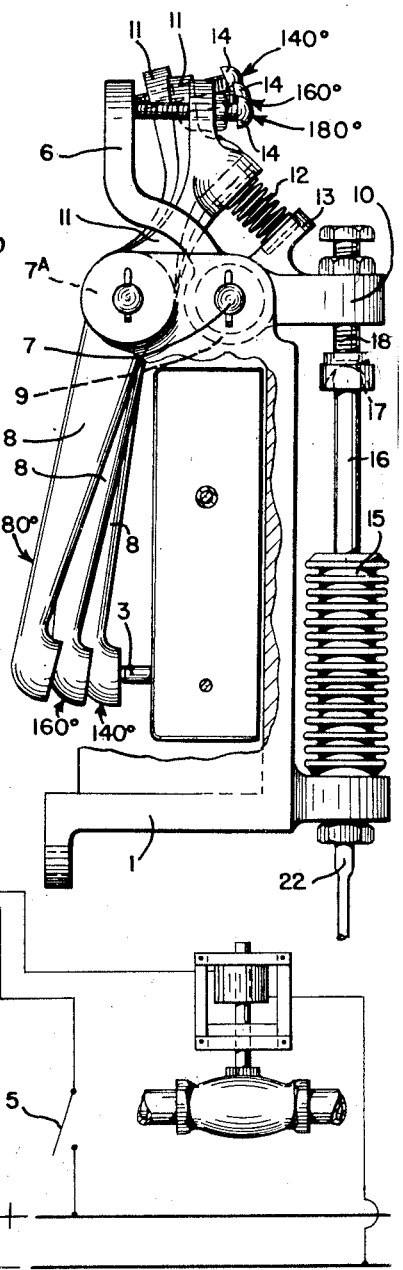
Figure 2 is an elevation, partly broken away, of parts seen in Figure 1 looking to the left.

In Figures 1 and 2, 1 designates the frame which may be of any suitable construction to be readily applied to the frame of a washing machine or the frame supporting a vat, the temperature of the liquid of which is to be controlled.

2 designates the switches of a series, each of these switches having an operating member or push button 3. The switches may be of any suitable or well known construction and are self-openable. Each of the switches is connected in an electric circuit 4 having a normally-open, selectively-closable switch 5 therein. Usually the switches 5 are closed by a cycle timer. In a temperature control, these circuits control the operation of heating means, as the flow of steam to the receptacle, or the energization of an electric heating element. In a level control, these switches control the opening and closing of a valve in the water feed pipe to the receptacle.

6 designates an actuator, this being a rocking element shown in Figures 1 and 2, as mounted upon a shaft 7, which is suitably mounted in the frame 1.

8 designates motion transmitting members between the actuator and the switch operating members 3. The motion transmitting members are shown as levers pivotally mounted on a shaft 7ª. These levers 8 are spaced different distances from their companion switch operating members 3, as seen in Figure 2, the lever controlling the lower degree of temperature being spaced a shorter distance than those controlling higher degrees of temperature. As here shown, there are three levers or motion transmitting members 8 controlling respectively temperatures, as for instance, 140°, 160° and 180° F. The lever 8 which controls the 140° temperature is normally spaced the smallest distance from its companion switch operating member 3; the lever controlling the 160° temperature a greater distance, and that controlling the 180° temperature a still greater distance.

The actuator 6 is common to all of the motion transmitting members or levers 8 and the motion thereof is transferred to the levers 8 through yielding means, as springs, when actuating the levers to operate the switch operating members 3, and is provided with means which positively move the levers 8 in a retrograde direction away from the switch operating members 3. The actuator 6 is here shown as a yoke having hubs 9 at its opposite ends mounted on the shaft 7ª and as having a rock arm 10, connected to the prime mover or motor to be presently described. Each lever 8 has an arm 11 extending above its pivot 7ª and yielding motion transmitting means, as a spring 12, interposed between the arm 11 and spring seats 13 on the actuator. Thus, by reason of the springs, the motion is yieldingly transferred to the levers 8 and the lever controlling the 160° temperature may continue to be actuated after the lever 8 controlling the 140° temperature has been stopped. Likewise the lever 8 controlling the 180° temperature may continue its movement after the levers controlling the 140° and 160° temperatures have been stopped. It will be borne in mind that if 140° temperature is desired, the switch 5 in the circuit 4 of the switch 2 controlling the 140° temperature will be closed by hand or by the timer and the switches 5 in the other circuits remain open, so that when the lever 8 controlling the 140° temperature operates its companion switch operating member 3, the heating means for the liquid in the drum of the machine will be discontinued by the cycle timer, and hence that if the switch 5 controlling a higher temperature 160° or 180° is closed, the others are open. When the lever 8 coacting with the switch operating member 3 of the switch 2 controlling the low temperature operates, it merely closes the switch 2 which is in an open circuit, and hence the actuator will continue its operation until the lever 8 closes the switch, which is connected in a circuit closed by one of the switches 5.

The positive connection between the actuator 10 and the levers 8 consists of a set screw 14 carried by the arm 11 of each lever 8 and thrusting against an intermediate part of the yoke of the actuator 6. Thus, during the return of the actuator 6, as to the right (Figure 2), when the prime mover or motor retracts or cools off, the arm thrusts positively against the set screw 14 and returns the levers 8 to their starting position.

The prime mover or motor is here shown as bellows 15 which lineally expand under the increase in temperature of the fluid therein. The construction of these bellows forms no part of this invention. They are a commercial product purchasable in the open market. The bellows 15 are carried by the frame 1 and the lineal expansion thereof transferred to the arm 10 of the actuator through a rod 16 thrusting at its end against the seat 17 provided on an adjustable member or screw 18 carried by the arm 10. A suitable light spring 19 causes the actuator 6 to return to its normal position, as the bellows retract.

20 designates a thermostatic element located in the lower portion of the receptacle 21 of the washing machine, this being suitably connected as by a pipe 22 to the bellows, so that the expansion of the fluid in the pipe 22 and the bellows is effected by the sensitiveness to the temperature of the thermostat 20. As the temperature of the water in the receptacle 21 increases, the fluid expands, and pressure due to the expansion transferred to the fluid in the bellows, causing it to expand lineally and operate the actuator 6 and transfer its movement to the levers 8 through the spring 12. Assume that the switch 5 in the circuit controlled by the 160° lever 8 is closed. As the temperature rises and the bellows 15 expand, the 140° lever 8 will first operate its companion switch operating member 3, but the closing of this switch is of no effect, because the switch 5 in its circuit is open. Hence, as the temperature continues to increase, the 140° lever 8 is stopped and the 160° and 180° levers continue their movement until the 160° lever operates its switch operating member 3, and this switch is in a circuit closed by the switch 5. As this circuit so closed controls the heating medium, the heating of the water in the receptacle 21 ceases. An analogous operation takes place when the switch 5 in the circuit of the switch 2 operated by the 180° lever 8 is operated.

In Figure 3, the actuator is shown as a rocking cam shaft 26 having cams 27, 28 and 29 thereon spaced different distances in a circumferential direction, as seen in Figure 4, to coact successively with the motion transmitting members 30, 31 and 32 for the switches 33 corresponding to the switches 2. These motion transmitting members are here shown as spring-pressed arms having followers as rollers coacting with the cams 27, 28 and 29 respectively. The lineal expansion of the bellows 15 is transferred to the rock shaft by suitable means, here shown as a lever 34 pivoted at 35 to the frame and having a short arm 36 coacting with the rod 37 of the bellows 38 and a longer arm connected to the cam shaft 26, as by a cable 39, connected at one end to the long arm of the lever 34 and winding at its other end around a drum 40 on the cam shaft 26. Obviously, during rocking of the lever 34, the shaft 26 will be rocked about its axis an amount commensurate with the lineal expansion of the bellows 38.

In Figure 5, the frame 51 is formed of a block of insulation having a series of upright passages 52 therein, and a header 53 connecting the lower ends of the passages 52 and communicating with the pressure transfer chamber 54, which is connected through a suitable conduit 55 to the pressure operated prime mover 56. The switches of the series of successively operated switches each include a terminal 57 extending into one passage 52 from the upper end thereof and adjustable to various distances or depths in the passage 52, and a liquid conductor, as mercury, rising in columns 58 in the lower portions of passages 52 from a body of mercury in the header 53 and filling part way into the chamber 54. Normally the upper ends of the columns are at the same level and spaced from the terminals 57. The terminals are adjusted different distances, for instance, the first terminal 57 to the left may, for example, be adjusted for water depth in the receptacle 58 of four inches, and the next receptacle for a depth of six inches; the third for a depth of eight inches, and the fourth for a depth of ten inches, and the lower ends of the terminals will be initially spaced apart from the upper ends of the columns 58 accordingly. Each of the terminals 57 is connected in a circuit corresponding to the circuit 4 having a selectively closable or timer closable switch 5 therein, these circuits controlling the closing of the valve in the water feed pipe to the receptacle. A suitable pressure gage 63 is connected in the pressure transfer pipe 55.

The pressure operated prime mover 56 is here shown as a bell or tube 59 communicating at its lower end with the receptacle 58 and connected at its upper end to the pressure transfer pipe 55. The tube or bell 59 is here shown as mounted in an outer casing 60 and open at its lower end. The casing communicates at its lower end with the receptacle 58 through a pipe 61 and the tube or bell 59 is spaced apart from the wall of the casing 60 and also from the bottom of the casing. The casing is provided with vent holes 62 at its upper ends. As the water fills into the receptacle 58 and the level rises, the water flows through the pipe 61 into the casing 60 and rises in the bell or tube 59 creating air pressure in the top or dome of the tube 59, which pressure increases as the quantity of water in the receptacle 58 increases. The pressure is transferred through the pipe 55 to the chamber 54 and acts upon the surface of the body of mercury in the chamber 54, thus causing the mercury to rise in the columns in the lower portions of passages 52. If the timer control operated switch in the circuit connected to the terminal 57 of the switch, to the left, is closed by the timer, the circuit in which it is connected, will be completely closed when the column of mercury in the passage 52, to the left (Figure 5) contacts the end of the terminal 57, and as before stated through suitable electrically operated means, the valve which controls the flow of liquid into the receptacle 58 is closed. If, however, the switch 5 of the circuit connected to the second, third or fourth terminals from the left is closed, the other switches 5 being, of course, open, then the pressure will continue to increase, and the columns of mercury rise after the column in the left hand passage 52 (Figure 5) has made contact with the terminal 57 in that passage and will continue to rise, until the column in the passage contacts the terminal 57 which is connected in a circuit closed by its companion switch 5.

What I claim is:

1. A control unit for controlling the predetermined condition of a liquid in a receptacle, said unit including a frame, a series of normally-open switches carried by the frame, each switch being connected in a conditioning means control circuit having a selectively closable switch therein, a pressure operated prime mover carried by the frame and operable different distances under different degrees of pressure, means connecting it to the receptacle and sensitive to changes in condition in the receptacle and operating to vary the pressure in the prime mover as the condition varies, the normally open switches being arranged to be closed by different movements of the prime mover and including adjustable means for varying the distance required of the prime mover to close the same, and means for transferring the movement of the prime mover under various degrees of pressure to said normally open switches.

2. A control unit for controlling the predetermined condition of a liquid in a receptacle, said unit including a frame, a series of normally-open switches carried by the frame, each switch being connected in a control circuit having a normally-open, selectively-closable switch therein, each of the former switches having an operating member, an actuator and motion transmitting members between the actuator and the operating members of the switches, one for each carried by the frame, the motion transmitting members being initially spaced different distances from the operating members with which they coact, and a pressure-operated prime mover carried by the frame and means sensitive to the condition of the liquid in the receptacle and operatively connected to the prime mover to vary the operation thereof in accordance with the change in condition in the liquid in the receptacle.

3. A control unit for controlling the predetermined condition of liquid in a receptacle, said unit including a frame, a series of normally-open switches carried by the frame, each switch being connected in a control circuit having a normally-open, selectively-closable switch therein, each of the former switches having an operating member, an actuator and motion transmitting members between the actuator and the operating members of the switches, one for each, carried by the frame, the motion transmitting members being initially spaced different distances from the switch operating members with which they coact, means for yieldingly transferring the motion of the actuator to the motion transmitting members to permit continued operation of the actuator, when one of the motion transmitting members is stopped in its movement by operating its companion switch operating member and a pressure-operated prime mover carried by the frame and means sensitive to the condition of the liquid in the receptacle and operatively connected to the prime mover to vary the operation thereof in accordance with the change in condition in the liquid in the receptacle.

4. A control unit for controlling the predetermined condition of a liquid in a receptacle, said unit including a frame, a series of normally-open switches carried by the frame, each switch being connected in a control circuit having a normally-open, selectively-closable switch therein, each of the former switches having an operating member, an actuator and motion transmitting members between the actuator and the operating members of the switches, one for each, carried by the frame, the motion transmitting members being initially spaced different distances from the switch operating members with which they coact, and a pressure-operated prime mover carried by the frame and means sensitive to the condition of the liquid in the receptacle and operatively connected to the prime mover to vary the operation thereof in accordance with the change in condition in the liquid in the receptacle, thereby operating the actuator an amount dependent upon the condition of the liquid, the actuator being a rocking element and the motion transmitting members levers pivoted to the frame and coacting with the switch operating members respectively, and a yielding connection between the actuator and the levers to yieldingly transmit the motion of the actuator to the levers and permit the levers to be actuated after one of the levers has been stopped.

5. A control unit for controlling the predetermined condition of a liquid in a receptacle, said unit including a frame, a series of normally-open switches carried by the frame, each switch being connected in a control circuit having a normally-open, selectively-closable switch therein, each of the former switches having an operating member, an actuator and motion transmitting members between the actuator and the operating members of the switches, one for each, carried by the frame, the motion transmitting members being initially spaced different distances from the switch operating members with which they coact, a pressure-operated prime mover carried by the frame and operated by the condition of the liquid in the receptacle for operating the actuator an amount dependent upon the change of condition of the liquid, the actuator being a rocking element and the motion transmitting members levers pivoted to the frame and coacting with the switch operating members respectively, a yielding connection between the actuator and the levers to yieldingly transmit the motion of the actuator to the levers in one direction and permit the levers to be actuated after one has been stopped, and a rigid connection between the actuator and the levers to transmit the motion of the actuator to the levers in the opposite direction.

6. A control unit for controlling the predetermined condition of a liquid in a receptacle, said unit including a frame, a series of normally-open switches carried by the frame, each switch being connected in a control circuit having a normally-open, selectively-closable switch therein, each of the former switches having an operating member, an actuator and motion transmitting members between the actuator and the operating member of the switches, one for each, carried by the frame, the motion transmitting members being initially spaced different distances from the operating members with which they coact, a bellows carried by the frame and connected to the actuator to actuate the same; in combination with a means located in the receptacle to which the unit is applied and sensitive to changes of condition in the liquid in the receptacle and connected to the bellows to vary the pressure of the liquid in the receptacle to the bellows.

FRITZ W. A. HENRICI.